United States Patent
Barrett et al.

[11] Patent Number: 5,943,628
[45] Date of Patent: Aug. 24, 1999

[54] RADIOTELEPHONE PROXIMITY DETECTOR

[75] Inventors: Steven Barrett, Suffolk, United Kingdom; Jouko Haavisto, Nokia; Mika Isotalo, Tampere, both of Finland

[73] Assignee: Nokia Mobile Phones Limited, Espoo, Finland

[21] Appl. No.: 08/955,508

[22] Filed: Oct. 22, 1997

[30] Foreign Application Priority Data

Oct. 23, 1996 [GB] United Kingdom .................. 9622082

[51] Int. Cl.$^6$ ...................................................... H04Q 7/32
[52] U.S. Cl. .......................... 455/574; 455/575; 455/462; 455/88
[58] Field of Search ..................................... 455/574, 575, 455/462, 456, 457, 88; 340/825.45, 573, 539, 568, 571

[56] References Cited

U.S. PATENT DOCUMENTS

| | | | |
|---|---|---|---|
| 4,057,805 | 11/1977 | Dowling | 340/573 |
| 4,511,761 | 4/1985 | Yamazaki et al. | 455/462 |
| 5,241,284 | 8/1993 | Nyqvist et al. | 330/297 |
| 5,291,542 | 3/1994 | Kivari et al. | 379/58 |
| 5,298,883 | 3/1994 | Pilney et al. | 340/573 |
| 5,371,784 | 12/1994 | Yankura | 455/462 |
| 5,378,935 | 1/1995 | Korhonen et al. | 327/114 |
| 5,416,435 | 5/1995 | Jokinen et al. | 327/113 |
| 5,471,655 | 11/1995 | Kivari | 455/127 |
| 5,570,369 | 10/1996 | Jokinen | 370/95.3 |
| 5,581,244 | 12/1996 | Jokimies et al. | 340/825.44 |
| 5,613,235 | 3/1997 | Kivari et al. | 455/343 |
| 5,640,147 | 6/1997 | Chek et al. | 340/825.45 |
| 5,642,063 | 6/1997 | Lehikoinen | 327/74 |
| 5,646,593 | 7/1997 | Hughes et al. | 340/573 |

FOREIGN PATENT DOCUMENTS

| | | |
|---|---|---|
| 0581416 A1 | 2/1994 | European Pat. Off. . |
| 0683587 A1 | 11/1995 | European Pat. Off. . |
| WO 93/19437 | 9/1993 | WIPO . |
| WO 95/02874 | 1/1995 | WIPO . |

OTHER PUBLICATIONS

WPI Abstract Accession No. 95–352005/46 & CN 1095532A (YANG), Nov. 23, 1994.

*Primary Examiner*—Wellington Chin
*Assistant Examiner*—Keith Ferguson
*Attorney, Agent, or Firm*—Perman & Green, LLP

[57] ABSTRACT

A radiotelephone proximity detector including a first proximity unit having a receiver and a second proximity unit having a transmitter, wherein the units can be coupled together and the coupling can be detected. One of the units is associated with a radiotelephone and the other with a user. When the units are coupled, they are responsive to the detection of their uncoupling, whereupon the transmitter of the second proximity unit transmits a proximity signal to the receiver of the first unit. The first proximity unit estimates the proximity of the radiotelephone and the user on the basis of the received proximity signal. Thus the two units operate together such that, when coupled, at least one of the units enters a standby mode, and when uncoupled, at least one of the units sends a proximity signal to the other unit.

15 Claims, 9 Drawing Sheets

Fig.10.
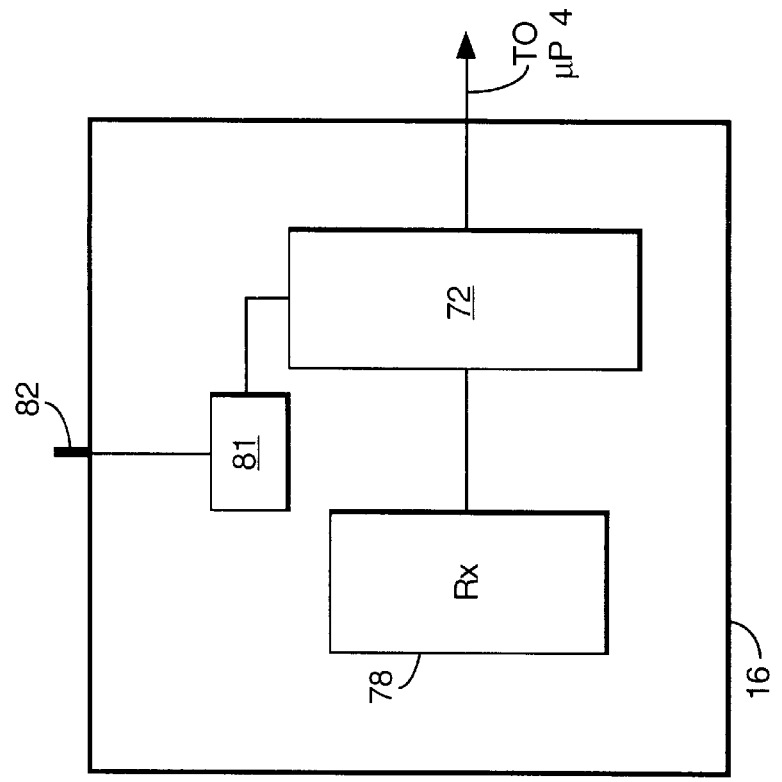
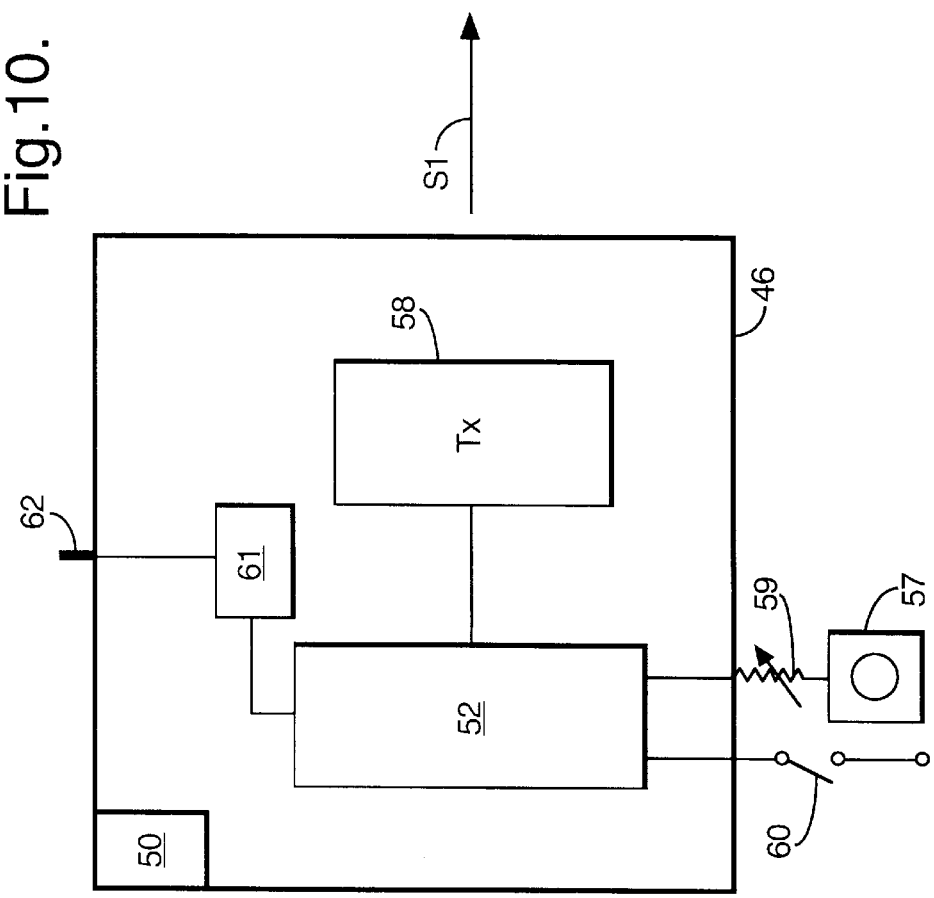

RADIOTELEPHONE PROXIMITY DETECTOR

BACKGROUND OF THE INVENTION

The present invention relates to a radiotelephone proximity detector.

It is known that portable radiotelephones by virtue of their mobility are easily misplaced, abandoned or stolen. The present invention aims generally to tackle these problems.

SUMMARY OF THE INVENTION

The present invention provides a radiotelephone proximity detector comprising a first proximity unit having a receiver and a second proximity unit having a transmitter, wherein the units can be coupled together and include means for detecting the coupling of the units, one of the units being associated with a radiotelephone and one of the units being associated with a user, the units being responsive to the detecting means such that when the units become uncoupled ('away position'), the transmitter transmits a proximity signal to the receiver and the first proximity unit estimates the proximity of the radiotelephone and the user on the basis of the received proximity signal, the units being responsive to the detecting means such that when the units become coupled ('home position'), at least one of the proximity units enters a standby mode.

By virtue of these features, the proximity units are able to consume energy at a very low rate when in their home position. Advantageously, the proximity units are activated/armed on adopting their away position in a manner which is transparent to the user.

The detecting means can detect the coupling of the units by being responsive to mechanical contact between portions/elements of the proximity units. Alternatively, the detecting means can detect the coupling of the units by being responsive to the units being in intimate proximity with each other such that there is significant capacitive coupling between portions/elements of the proximity units.

In one embodiment, the second proximity unit estimates the proximity of the first and second proximity units by comparing the received signal strength of a proximity signal transmitted by the first proximity unit with a threshold. If this received signal strength falls below the threshold, then the second proximity unit estimates that the first proximity unit is too far away from the second proximity unit and causes an alarm to be sounded. Similarly, the first proximity unit estimates the proximity of the first and second proximity units by comparing the received signal strength of a proximity signal transmitted by the second proximity unit with a threshold, which need not be the same as the threshold in the second proximity unit. If this received signal strength falls below the threshold, then the first proximity unit estimates that the second proximity unit is too far away. In response to this estimation, the first proximity unit may cause an alarm to be sounded, but it need not.

In other embodiments, the proximity of the first and second proximity units is estimated by the time taken for the proximity signals to travel between the first and second proximity units. Preferably, the first proximity unit is located within the casing of the radiotelephone and is powered by the battery of the radiotelephone. The transmitter of the second proximity unit is preferably dedicated to the task of monitoring the proximity of the first and second units. In other embodiments, the main transceiver of the radiotelephone which transmits and receives signals to and from the cellular network can also perform the role of the transmitter of the second proximity unit. Preferably, the second proximity unit is associated with the user by being integrated with means which are ordinarily worn or carried by the user, for example, a belt clip assembly, a hearing aid, a brief case or a case for carrying the radiotelephone.

The communication link is preferably established using radio wave transmission, but other techniques such as ultrasonic wave transmission can also be used.

BRIEF DESCRIPTION OF THE DRAWINGS

Exemplary embodiments of the invention are hereinafter described with reference to the accompanying drawings, in which:

FIG. 10 is a schematic showing the interaction between a second preferred embodiment of the proximity unit of the belt clip assembly and the telephone.

DESCRIPTION OF THE PREFERRED EMBODIMENT

Figure 1:
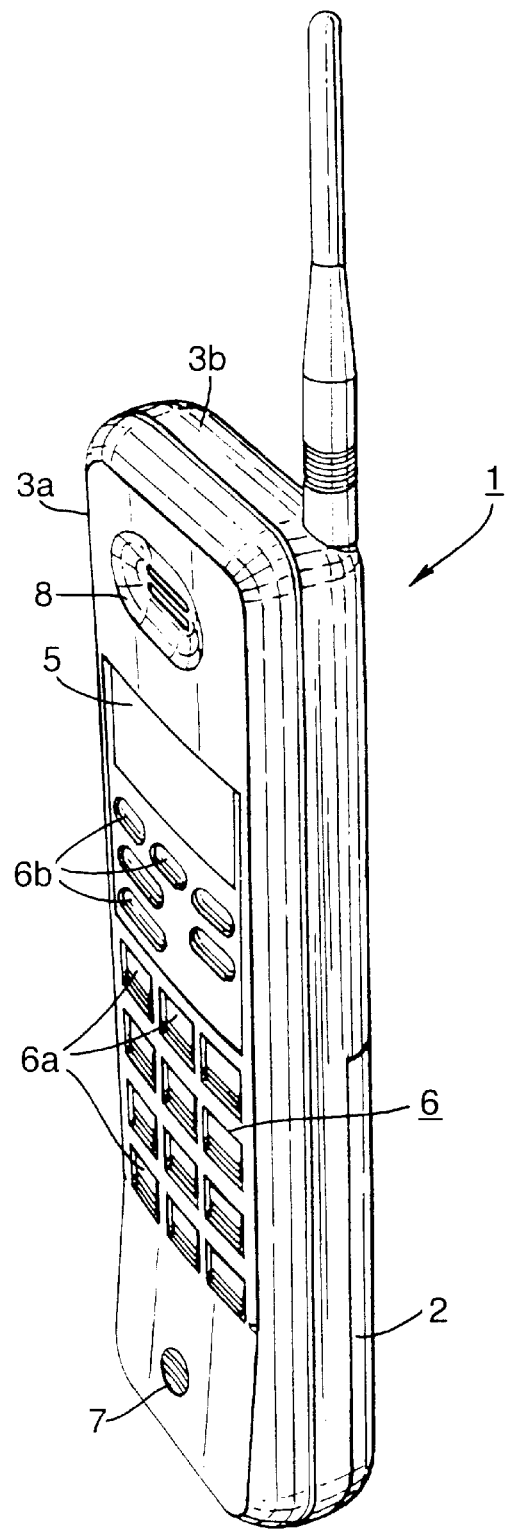
FIG. 1 is a perspective of a cellular mobile telephone.
Figure 2:
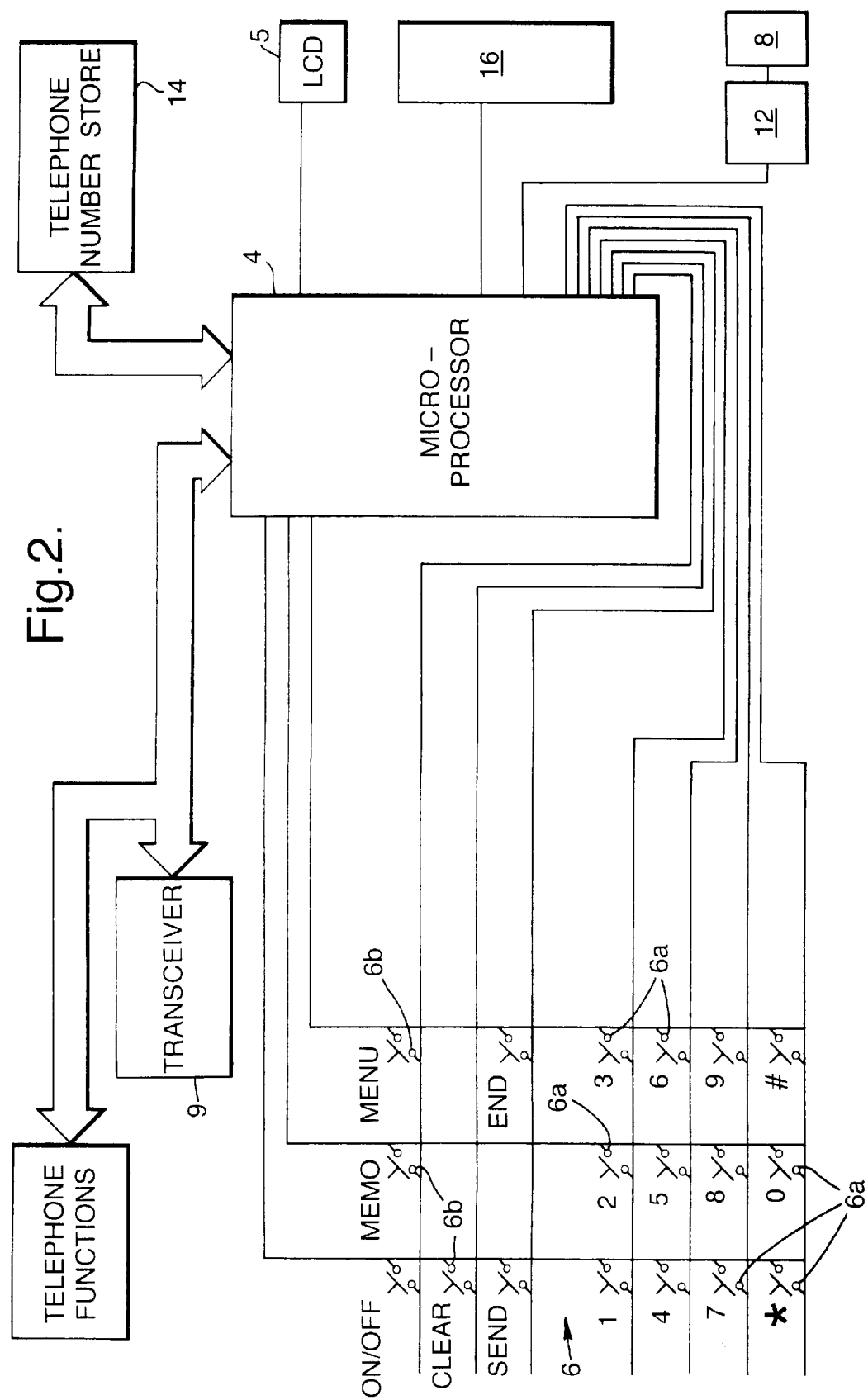
FIG. 2 is a schematic diagram of the main features in the telephone of FIG. 1.

The telephone apparatus shown in FIG. 1 is a cellular mobile telephone having an A or front cover 3*a* and a B or rear cover 3*b* powered by a rechargeable battery pack 2. The telephone 1 includes a transceiver 9 for transmitting and receiving signals to and from the cellular network and all the other features conventionally found in a cellular telephone, as shown schematically in FIG. 2. Since these aspects of the telephone are not directly relevant to the instant invention no further details will be given here, except to say that a microprocessor 4 (see FIG. 2) is employed to control all the basic functions of the telephone 1 and to control the keypad, display functions and a tone generator 12. Additionally, a memory 14 is provided for storing third party subscriber telephone records. The user-interface of telephone 1 comprises a display, e.g. a liquid crystal display 5 and a keypad 6 on the front of the telephone 1. The display is coupled to and regulated by the microprocessor 4. The keypad 6 essentially comprises two main sets of keys, namely alphanumeric keys 6*a* associated with alphanumeric data especially for dialling telephone numbers, but also for entering alphanumeric data into the telephone number store 14; and a set of function keys 6*b* for enabling various predetermined functions or operations.

The telephone also includes a microphone 7, a loudspeaker 8, and a proximity unit 16 which will be described in greater detail later.

The mobile telephone is equipped with a belt clip assembly 20 which enables a user to attach the telephone 1 to his belt for convenient transportation when the telephone is not in use. The belt clip assembly 20 is in its mechanical aspects largely known in the art. Full details of its mechanical construction can be found in EP-A1-683587, but for the sake of completeness the following brief description is included.

Figure 3:
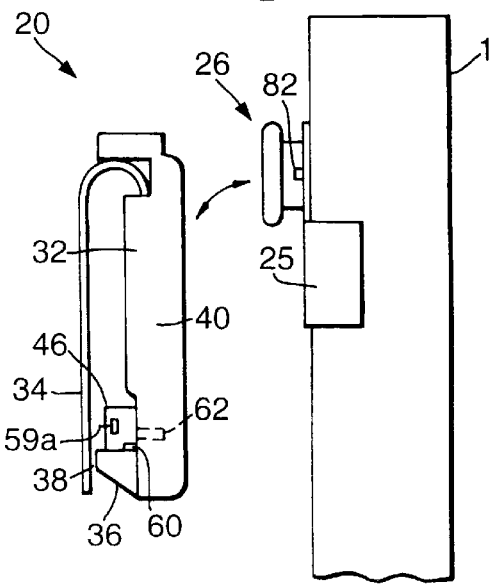
FIG. 3 is a side view of the telephone of FIG. 1 together with a belt clip assembly.
Figure 5:
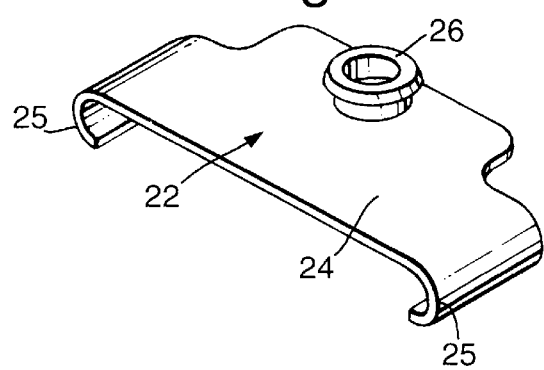
FIG. 5 is a perspective view of the clip member of the belt clip assembly of FIG. 3 in isolation.

The belt clip assembly 20 comprises a clip member 22 as shown in FIG. 5. The clip member 22 removably snap-fits onto the rear of the telephone casing. The clip member 22 includes a planar member 24 having bent ends which serve as arms 25 to removably grasp in a snap-fit manner the telephone casing as shown in FIG. 3. A first fastening element 26 upstands from the planar member 24. The belt clip assembly 20 further comprises a body portion 28 which attaches to a belt 30 of a user. The body portion 28 comprises a back member 32 from which rearwardly projects a j-shaped member 34 and a protrusion 36. The j-shaped member 34 and the protrusion 36 define a channel 38 as shown in FIG. 3 within which the belt 30 can be slid and retained. Guide flanges 40 project forwardly from the back member 32 and define a region 41 into which the first fastening element 26 of the clip member 22 can be slid. A second fastening element 42 projects forwardly into the region 41 and can co-operate with the first fastening element 26 to secure the clip member 22 and hence the telephone in place.

The belt clip assembly 20 further comprises a proximity unit 46 mounted to the rear of the back member 32.

Figure 6:
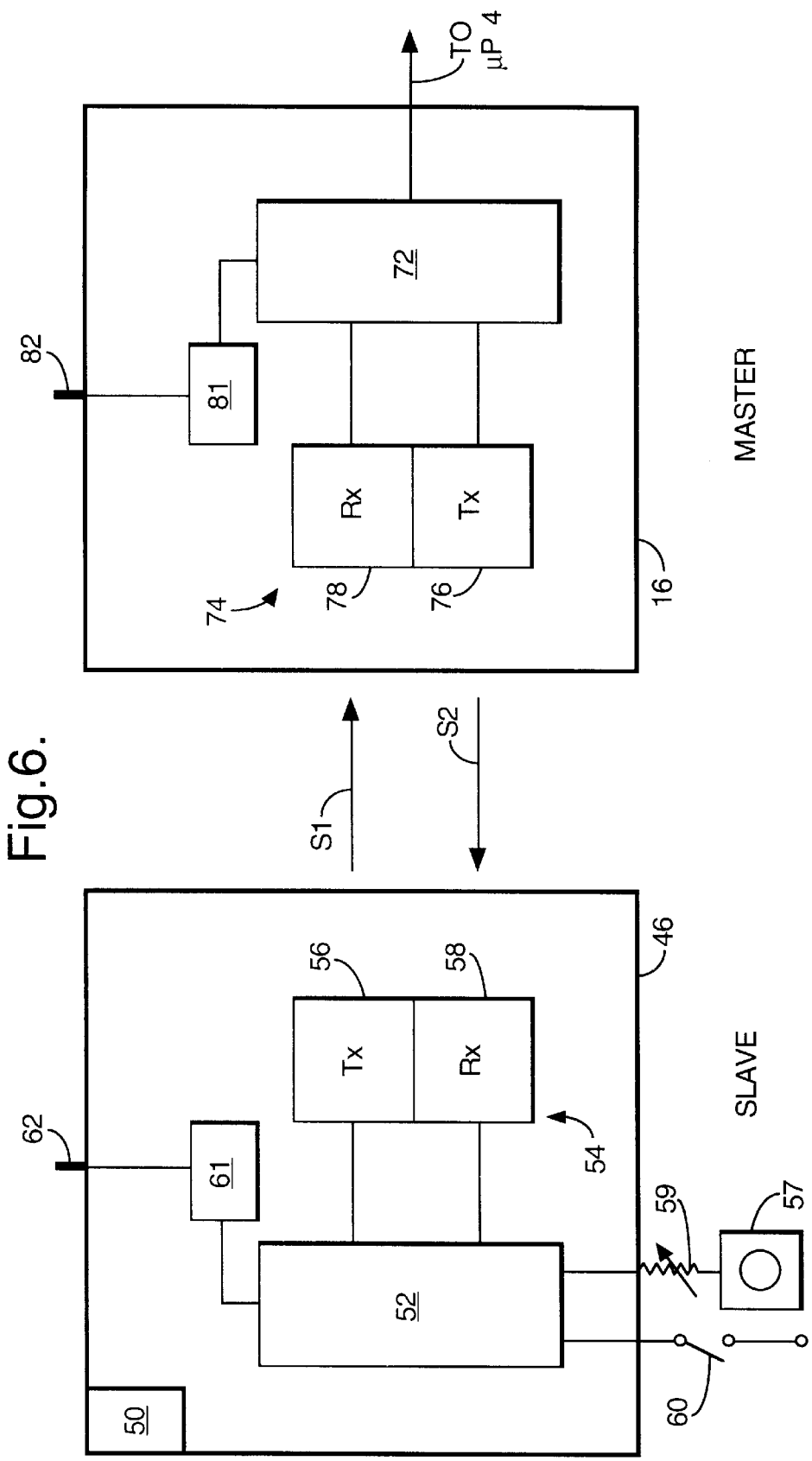
FIG. 6 is a schematic showing the interaction between a first preferred embodiment of the proximity unit of the belt clip assembly and the telephone.

The telephone proximity unit 16 and the belt clip assembly proximity unit 46 are shown in FIG. 6.

The belt clip assembly proximity unit 46 is powered by a low power supply 50 including a replaceable battery. The proximity unit 46 also comprises a controller 52 which controls the operation of a transceiver 54. The controller 52 can be implemented as dedicated combinational logic or as a microprocessor. The transceiver 54 comprises a transmitter 56 and a receiver 58 for transmitting and receiving a lower power ultra high frequency (UHF) signals to and from the telephone proximity unit 16, respectively. The transceiver 54, under control of the controller 52, can be switched into a reduced power mode in which the transmitter 56 is non-operational. The controller 52 also controls a loudspeaker 57, the output volume of which is controllable by the user via a potentiometer 59. A slideable control member of the potentiometer 59 is denoted in FIG. 3 by reference numeral 59a. The controller 52 is also responsive to the state of a depressable key 60.

The telephone proximity unit 16 is powered by the battery 2 of the telephone. The proximity unit 16 also comprises a controller 72 which controls the operation of a transceiver 74. The controller 72 can be implemented as dedicated combinational logic or as a microprocessor. The transceiver 74 comprises a transmitter 76 and a receiver 78 for transmitting and receiving lower power ultra high frequency (UHF) signals to and from the proximity unit 46, respectively. The transceiver 74, under the control of the controller 72, can be switched into a reduced power mode in which the transmitter 76 is non-operational. The controller 72 is controlled by the microprocessor 4 of the telephone 1.

Figure 4:
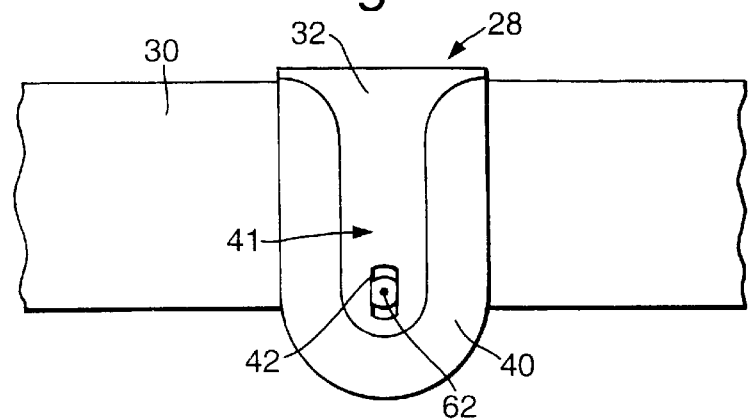
FIG. 4 is a front view of the body of the belt clip assembly of FIG. 3 attached to a belt.

The belt clip proximity unit 46 further comprises detection circuitry 61 having a detecting contact 62. The detecting contact 62 is located, as can be seen in FIG. 4, in the second fastening element 42. The telephone proximity unit 16 further comprises detection circuitry 81 having a detecting contact 82. The detecting contact 82 projects through the rear casing or cover 3b so as to be located, as can be seen in FIG. 3, in the first fastening element 26. When the telephone 1 is mounted to the belt clip assembly 20 in a so-called 'home position', the detecting contacts 62, 82 electrically contact each other. The presence of the telephone 1 is thereby electrically signalled to the detection circuitry 61 and hence the controller 52, and the presence of the belt clip assembly is likewise electrically signalled to the controller 72.

As can be seen in FIG. 6, the transmitter 56 is operable to transmit a signal S1 comprising a carrier signal at a frequency F1 having identification coding C1, indicating the belt clip proximity unit 46 as the origin of the signal, modulated into it. The receiver 78 is operable to receive and demodulate the identification coding from the signal S1 and communicates this and also the power or strength of the received signal to the controller 72. Similarly, the transmitter 76 is operable to transmit a signal S2 comprising a carrier signal at frequency F2 having identification coding C2, indicating the telephone proximity unit 16 as the origin of the signal, modulated into it. The receiver 58 is operable to receive and demodulate the identification coding from the signal S2 and communicates this and also the power or strength of the received signal to the controller 52. The belt clip proximity unit 46 and the telephone proximity unit 16 are a 'matched pair' in that the belt clip proximity unit 46 is pre-programmed to recognise the identification coding C2 of the telephone proximity unit 16 and vice versa.

In operation, when the telephone 1 is in its home position, this is detected, as a result of the electrical contact between detecting contacts 62, 82, by the detection circuitries 61, 81 which place the proximity units 16, 46 into a sleep or standby mode. In the sleep mode, only the detection circuitries 61, 81 consume energy, albeit a minimal amount, the rest of the units 16, 46 being switched off. When the telephone is removed from the belt clip proximity unit 46 it is in a so-called 'away position' in which there is no electrical contact between the detecting contacts 62, 82. The absence of electrical contact between the detecting contacts 62, 82 triggers the detection circuitries 61, 81 which switch on the proximity units 46, 16.

Figure 7:
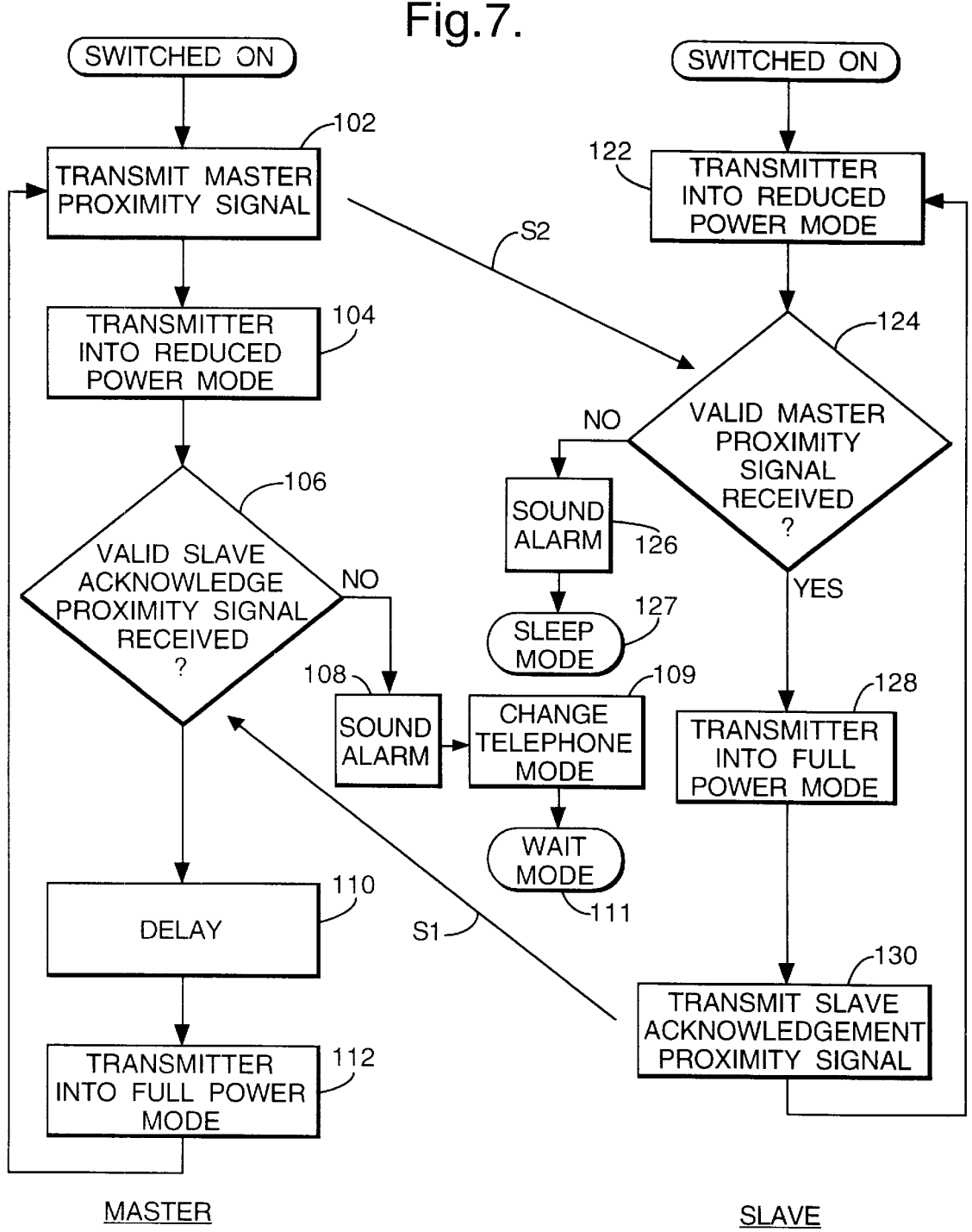
FIG. 7 is a flow diagram showing the operation of the proximity units in the separated or away position.
Figure 8A:
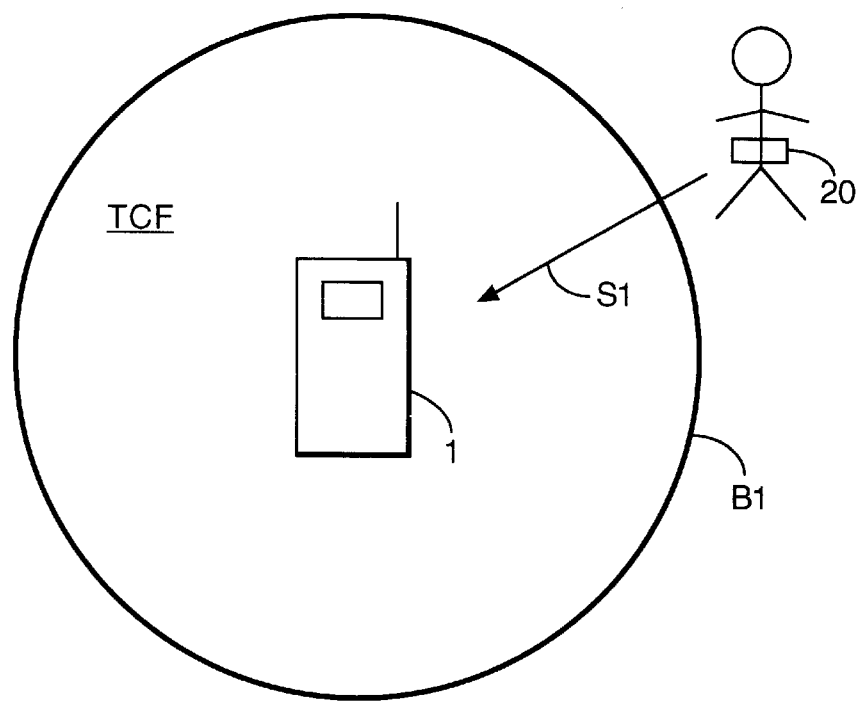
FIGS. 8(*a*) and 8(*b*) show diagrams of the control field set up by the telephone proximity unit.
Figure 8B:
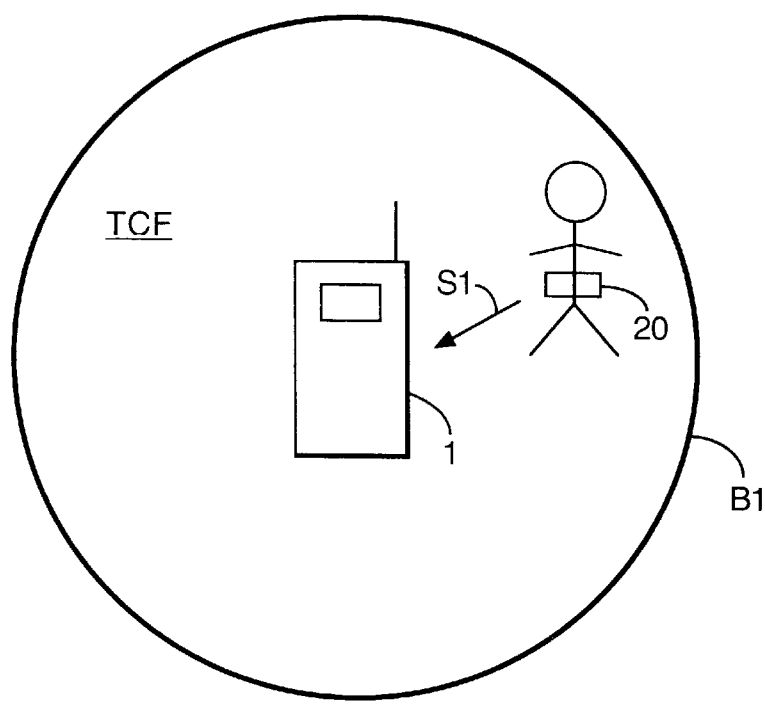

In the away position, the proximity units 16, 46 switch on and operate as shown in the flow diagram of FIG. 7. The telephone proximity units 16 acts as master and the belt clip proximity unit 46 acts as slave. Referring first to the operation of the telephone proximity unit 1 6, its transmitter 76 transmits master proximity signal S2 at step 102. After this transmission, the transmitter is switched into reduced power mode at step 104. Next, at step 106, its receiver 78 waits to receive the slave acknowledgement proximity signal S1 from the 'matched' belt clip proximity unit 46. If no signal is received within a predetermined interval, say T, or within this interval a signal is received but the identification coding does not match or equal C1, step 108 is executed by which an alarm is sounded for a brief interval. Similarly, should the correct signal S1 bearing the correct identification coding be received but the received signal strength is of a magnitude less than a first threshold because the belt clip assembly proximity unit 46 is too far away, then step 108 is again executed. FIG. 8(a) shows this situation with the boundary B1, indicating the region where the received signal strength of S1 equals the first threshold. The region within the boundary B1 is referred to as the telephone control field TCF. In all the above circumstances, the telephone proximity unit 16 sounds the alarm at step 108 as a result of having failed to receive an acceptable acknowledgement to the proximity signal S2 transmitted in step 102. At step 108, the alarm is sounded at the main loudspeaker 8 of the telephone by the microprocessor 4 via the tone generator 12 under the instruction of the controller 72. The out-of-range alarm sound is selected to be very distinct from any of the ringing tones with which the telephone may be ordinarily provided. After the alarm has been sounded for a brief interval at step 108, the controller 72 of the radiotelephone proximity unit 16, at step 109, sends instructions to the microprocessor 4 which switches the telephone from its normal mode into a mode in which it waits to have a PIN number entered and all other functions of the telephone, such as the capability to receive or place a call, are unavailable to the user. At step 111, the controller 72 waits to receive instructions from the microprocessor 4 which indicate that the correct PIN number has been entered. Once the correct PIN number has been entered the alarm can be re-enabled via a menu option on the telephone to operate from step 112. On the other hand, the telephone proximity unit 16 can be reset into sleep mode by returning it to the home position in which it is mounted on the belt clip assembly 20. However, should, within interval T, a signal bearing the correct identification coding C1 and within a greater than predetermined magnitude be received, then the telephone proximity unit 16 presumes that the belt clip proximity unit 46 is within range, i.e. within the telephone control field TCF as shown in FIG. 8(b), and a delay is executed at step 110. After the delay, the transmitter 76 is switched back into full power mode at step 112 and proceeds step 102 to repeat the above steps.

Figure 9A:
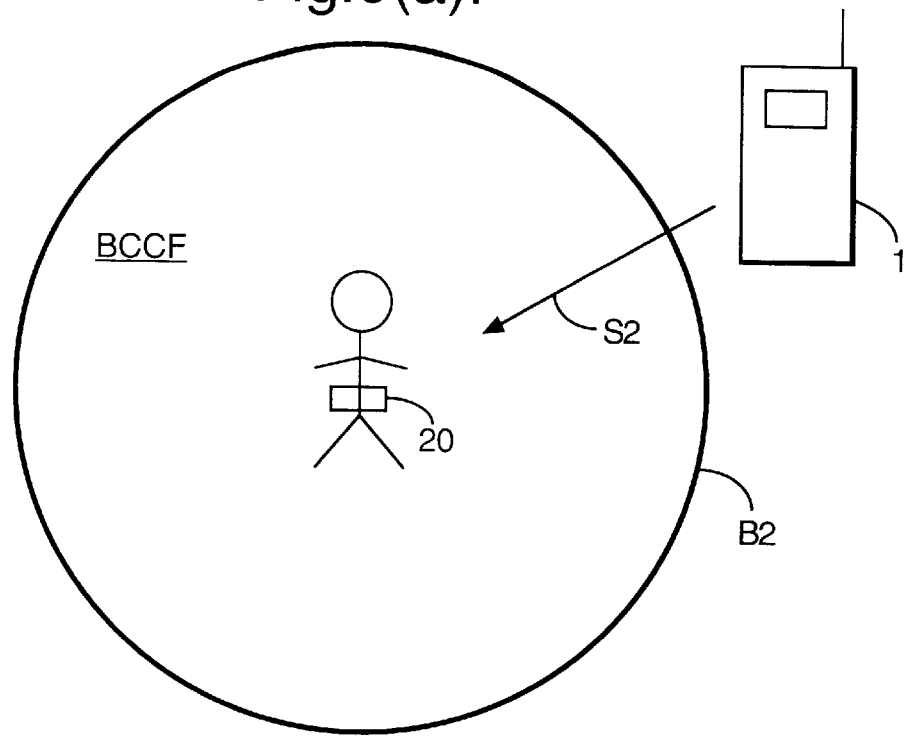
FIGS. 9(*a*) and 9(*b*) show diagrams of the control field set up by the belt clip assembly proximity unit.
Figure 9B:
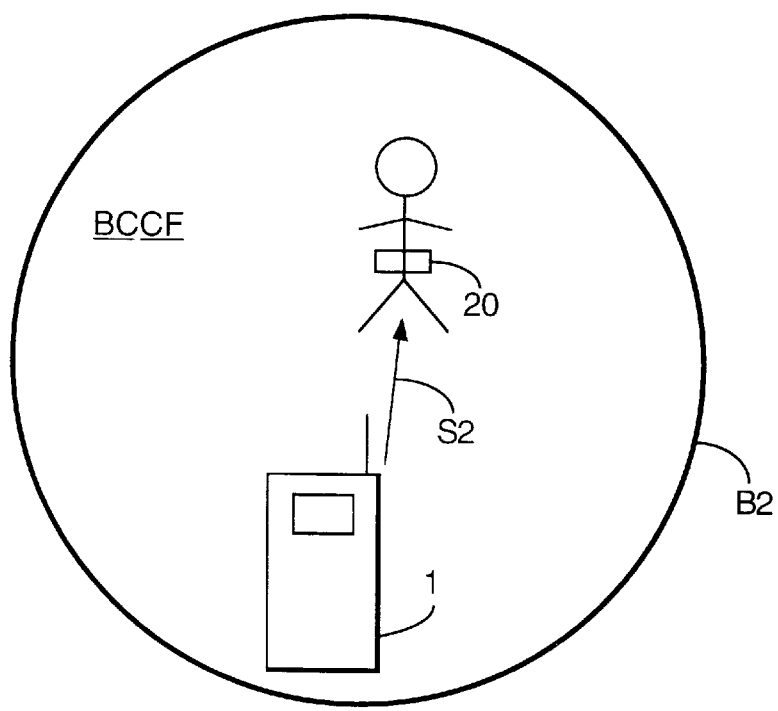

Meanwhile, after the belt clip proximity unit 46 is switched on, the transmitter 56 is placed into reduced power mode at step 122. Next at step 124, its receiver 58 waits to receive the master proximity signal S2 from the 'matched' telephone proximity unit. If no signal is received within a predetermined interval, say again T, or within this interval a signal is received but the identification coding does not match or equal C2, step 126 is performed by which an alarm is sounded for a brief interval. Similarly, should the correct signal S2 bearing the correct identification coding be received but the signal is magnitude less than a second threshold because the telephone proximity unit 16 is too far away, then step 126 is executed. FIG. 9(a) shows this situation with the boundary B2 indicating the region where the signal strength of S2 equals the second threshold. The region within the boundary B2 is referred to as the belt clip control field BCCF. In all the above circumstances, the belt clip proximity unit 46 as a result of having failed to properly receive the master proximity signal S2, sounds an alarm for a brief interval (step 126) via the loudspeaker 57 accordingly and enters the sleep mode at step 127. The operation of the belt clip proximity unit 46 can be resumed at step 122 by pressing the switch 60. However, should, within interval T, a signal bearing the correct identification coding C2 and with a greater than predetermined magnitude be received, then the belt clip proximity unit 46 presumes that the telephone proximity unit 16 is within range, i.e. within the belt clip control field BCCF as shown in FIG. 9(b), and the transmitter 56 is switched into full power mode at step 128. Next, at step 130, the transmitter 56 transmits the slave acknowledgement signal S1 and proceeds to step 122 to repeat the above steps.

If at any time during operation in the away position as described in relation to FIG. 7, the proximity units 16, 46 are returned to the home position, this is detected by the detection circuitries 61, 81 and the proximity units 16, 46 return to the sleep mode.

As a variant to the described method of operation, the proximity units 16, 46 can, at steps 106, 124, defer taking action in response to having failed to receive a valid proximity signal or a proximity signal of acceptable signal strength for a predetermined number of executions of the respective steps. This will assist in preventing false alarms caused by spurious and transient events in the environment. As a refinement of this approach when the telephone proximity unit 16 is receiving a valid proximity signal S1 but the signal strength is repeatedly below the first threshold, the telephone proximity unit 16 can monitor the trend in the received signal strength and this trend can be used to govern the action which is taken, should that be necessary (i.e. after the predetermined number of executions of step 106). For example, if after the predetermined numbers of executions of step 106, the controller 72 determines that the telephone and belt clip proximity units 16, 46 are moving apart very rapidly, then the telephone can be completely disabled as described above. On the other hand, if the telephone and belt clip proximity units 16, 46 are not moving apart rapidly or are stationary, then only an alarm need be sounded.

These variants can also be applied to the other preferred embodiment which is described later.

It will be appreciated that the size of the telephone control field TCF is determined by the transmitting power of the transmitter 56 of the belt clip assembly proximity unit 46 and the first threshold. Likewise, the size of belt clip control field BCCF is determined by the power of the transmitter 76 of the telephone proximity unit 16 and the second threshold. The size of the control fields TCF and BCCF are selected such that when the user makes use of the telephone 1 in the normal way, the telephone 1 remains within the control fields. A typical suitable size for the control fields TCF and BCCF is 2–3 metres.

The controller 52 is also responsive to the remaining charge available from the power supply 50 and, when the remaining charge is below a predetermined threshold, the controller 50 sounds a brief alarm, from time to time, via the loudspeaker 57 to indicate this. The alarm which is signalled in these circumstances is distinct from the out-of-range alarm mentioned above.

In other embodiments of the invention, the telephone proximity unit 16 need not act as the master, but can perform the role of the slave. In other embodiments, either one of the proximity units can act as a 'passive relay' for the proximity signal transmitted by the other proximity unit. The passive relay can comprise a simple resonance circuit and an antenna, and is operable to reflect the proximity signal, modified by the characteristics of the resonance circuit, back to the other proximity unit.

Another preferred embodiment of the invention, in which only a one-way communication link is established between the proximity units of the belt clip and the telephone, is shown in FIG. 10. Similar parts have been given the reference numerals.

In operation, when the telephone 1 is in its home position mounted to the belt clip assembly 20, both proximity units 16, 46 are in the sleep mode. In the away position, when the telephone 1 becomes uncoupled from the belt clip assembly 20, the proximity units 16, 46 are switched on and operate as shown in the flow diagram of FIG. 11.

Referring first to the operation of the telephone proximity unit, its receiver 78, at step 202, waits to receive a proximity signal S1 from the matched belt clip proximity unit 46. If a signal is received within a predetermined interval, say T, having a received signal strength greater than a threshold and bearing an identification coding which matches C1, then step 202 is re-executed immediately. This situation corresponds to FIG. 8(b) in which the belt clip proximity unit 46 is within the boundary B1 of the telephone control field TCF.

On the other hand, if it is determined at step 202 within the predetermined interval T that no signal is received, or a signal is received but the identification coding does not match C1, or the received signal does bear the correct identification coding C1 but has a signal strength of magnitude below the threshold, then the controller 72 presumes that the situation in FIG. 8(a) exists and sounds an out-of-range alarm for a brief interval at step 204.

After step 204, the controller 72 at step 206 sends instructions to the microprocessor 4 which switches the telephone 1 from its normal mode into a mode in which its calling placing capability is inhibited but all other functions of the telephone 1 remain available to the user. Next at step 208, the receiver 78 again waits to receive a proximity signal S1 from the matched belt clip proximity unit 46. If a signal is received within a predetermined interval, say T, having a received signal strength greater than a threshold and bearing an identification coding which matches C1, then the situation in FIG. 8(b) is again presumed to exist and so step 210 is executed by which the controller 72 sends instructions to the microprocessor 4 which switches the telephone 1 back into its normal mode. Step 202 is then repeated. On the other hand, if it is determined at step 208 within the predetermined interval T that no signal is received or a signal is received but the identification coding does not match C1, then step 208 is immediately re-executed. However, if a signal is received bearing the correct identification coding C1, but the strength of this signal is below the threshold, step 212 is executed by which the controller 72 sends instructions to the microprocessor 4 which cause the loudspeaker 8 of the telephone 1 to emit a brief locating alarm having a pitch and/or volume proportional to the received signal strength of S1. The characteristics of the locating alarm thus assist the user in homing in on the telephone 1. Step 208 is then repeated. The locating alarm of step 212 is selected to be very distinct from the out-of-range alarm of step 204.

Meanwhile, after the belt clip proximity unit 46 is switched on, its transmitter 56 is placed into full power mode at step 220. Next, at step 222, the transmitter 56 transmits the proximity signal S1. Afterwards, at step 224, the transmitter 56 is placed into reduced power mode. After a delay of T at step 226, the belt clip proximity unit 46 returns to step 220. The switch 60 can be used to toggle the belt clip proximity unit 46 between the operation shown in FIG. 11 and sleep mode.

Figure 11:
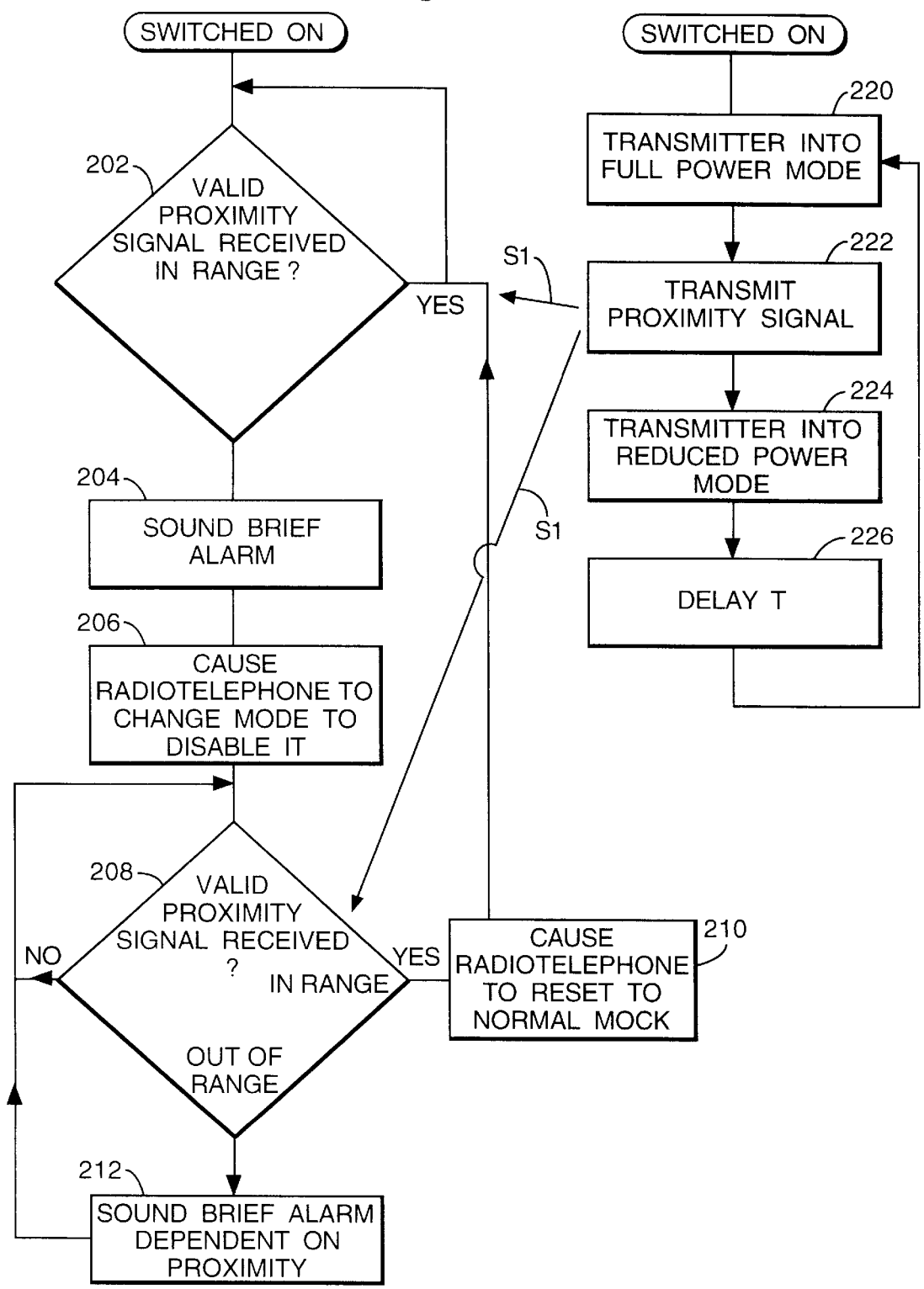
FIG. 11 is a flow diagram showing the operation of the proximity units in the away position.

In a similar way to the first preferred embodiment, if at time during operation in the away position as described in relation to FIG. 11, the proximity units 16, 46 are returned to the home position, this is detected by the detection circuitries 61, 81 to cause the proximity units 16, 46 to return to the sleep mode.

When it is stated in the described embodiments that the telephone 1 sounds an alarm because the telephone and belt clip proximity units 16, 46 are outside acceptable range of each other, in other embodiments, this audio alarm can be accompanied or replaced by other forms of alarm. Other forms of alarm include a visual alarm displayed on the display 5. The visual alarm comprises an indication, based on text or an icon/symbol, that the out-of-range condition exists, and/or the name of the authorised user of the telephone 1. The display of the name of the authorised user can be useful in ensuring that a similar telephone belonging to a third party is not mistakenly picked up. Another alarm takes the form of the telephone automatically sending a message to a predetermined number.

We claim:

1. A radiotelephone proximity detector, comprising:

a first proximity unit having a receiver and a second proximity unit having a transmitter, one of the units being associated with a radiotelephone and one of the units being associated with a user;

means for coupling said units together in a home position;

means for detecting when the units are coupled together in the home position and when the units become uncoupled from the home position, and for providing a first signal and a second signal respectively indicative thereof;

means, responsive to the second signal, for causing the transmitter to transmit a proximity signal to the receiver for indicating the proximity from the home position;

means, responsive to the proximity signal, for estimating the proximity of the radiotelephone and the user on the basis of the received proximity signal; and means, responsive to the first signal, for causing at least one of the proximity units to enter a standby mode.

2. A detector as in claim 1, wherein the detecting means comprises a detecting element on the first proximity unit and a detecting element on the second proximity unit.

3. A detector as in claim 2, wherein the detecting means is responsive to contact between the detecting elements.

4. A detector as in claim 2, wherein the detecting means is responsive to a capacitive coupling between the detecting elements.

5. A detector as in claim 1, wherein the proximity unit associated with the user is adapted to be mounted in a belt clip assembly, which the user can wear.

6. A detector as in claim 1, wherein the transmitter has a reduced power mode in which it is deactivated.

7. A detector as claimed in claim 1 wherein the first proximity unit is associated with a radiotelephone and the second proximity unit is associated with a user.

8. A detector as claimed in claim 1 wherein the estimating means comprises means for estimating the proximity of the first and second proximity units by comparing the signal strength of the received proximity signal with a threshold.

9. A detector as claimed in claim 8 further comprising means, responsive to the received signal strength falling below the threshold, for sounding an alarm.

10. A detector as claimed in claim 1 wherein the estimating means is in the first proximity unit.

11. A detector as claimed in claim 1 wherein the estimating means is in the second proximity unit.

12. A detector as claimed in claim 1 wherein the the estimating means comprises means for estimating the proximity of the first and second proximity units by estimating the time taken for the proximity signal to travel between the first and second proximity units.

13. A detector as claimed in claim 12 wherein the first proximity unit comprises means for locating the unit within the casing of a radiotelephone and is powered by the battery of the radiotelephone.

14. A detector as claimed in claim 1 wherein the transmitter of the first proximity unit comprises means dedicated to the task of monitoring the proximity of the first and second proximity units.

15. A detector as claimed in claim 1 wherein the first proximity unit is associated with a user and the second proximity unit is associated with a radiotelephone.

* * * * *